(12) United States Patent
Olenio et al.

(10) Patent No.: US 6,501,500 B1
(45) Date of Patent: Dec. 31, 2002

(54) APPARATUS FOR ROUTING HOSES AND CABLES IN AN IMAGING SYSTEM

(75) Inventors: Robert D. Olenio, North Andover, MA (US); Donald B. Richardson, Jr., Atkinson, NH (US); John F. Nolan, Haverhill; Jeffrey Knox, Lynnfield, both of MA (US)

(73) Assignee: AGFA Corporation, Wilmington, MA (US)

( * ) Notice: Subject to any disclaimer, the term of this patent is extended or adjusted under 35 U.S.C. 154(b) by 0 days.

(21) Appl. No.: 09/157,850

(22) Filed: Sep. 21, 1998

(51) Int. Cl.[7] .................................................. B41J 2/435
(52) U.S. Cl. ...................................................... 347/263
(58) Field of Search .................................. 347/245, 263, 347/89, 18, 223, 225; 74/490.04; 83/136, 177; 400/692

(56) References Cited

U.S. PATENT DOCUMENTS

| 4,343,211 A | * | 8/1982 | Volle ............................. 83/177 |
| 5,093,685 A | | 3/1992 | Blanding ...................... 355/43 |
| 5,096,316 A | * | 3/1992 | Otsuka et al. ............... 400/692 |
| 5,598,739 A | | 2/1997 | Blake et al. .................... 74/89 |
| 5,623,853 A | * | 4/1997 | Novak et al. ............. 74/490.09 |
| 6,097,417 A | * | 8/2000 | Richardson, Jr. et al. ... 347/225 |
| 6,174,055 B1 | * | 1/2001 | Sugikubo et al. .............. 347/89 |

FOREIGN PATENT DOCUMENTS

| FR | 2230472 | 12/1974 | ............. B26F/1/38 |
| JP | 61-206682 | * 9/1986 | ............. B41J/29/00 |

* cited by examiner

Primary Examiner—Hai Pham
(74) Attorney, Agent, or Firm—John A. Merecki; Robert A. Sabourin; Joseph D. King

(57) ABSTRACT

A hose and cable routing system for routing and flexing a coolant supply hose, a coolant return hose, and an electrical cable to a laser system mounted on a movable optical carriage in an imaging system without introducing mechanical disturbances to the optical carriage. The hose and cable routing system includes a support tray, mounted to the imaging system, for supporting the coolant hoses and electrical cable, and a movable support bracket for supporting and running the coolant hoses and electrical cable from the support tray to the optical carriage. A track is provided to guide the movable support bracket along the imaging system in response to a displacement of the optical carriage. A vibration isolator is mounted between the support bracket and the optical carriage. Other embodiments of the hose and cable routing system are also disclosed.

31 Claims, 9 Drawing Sheets

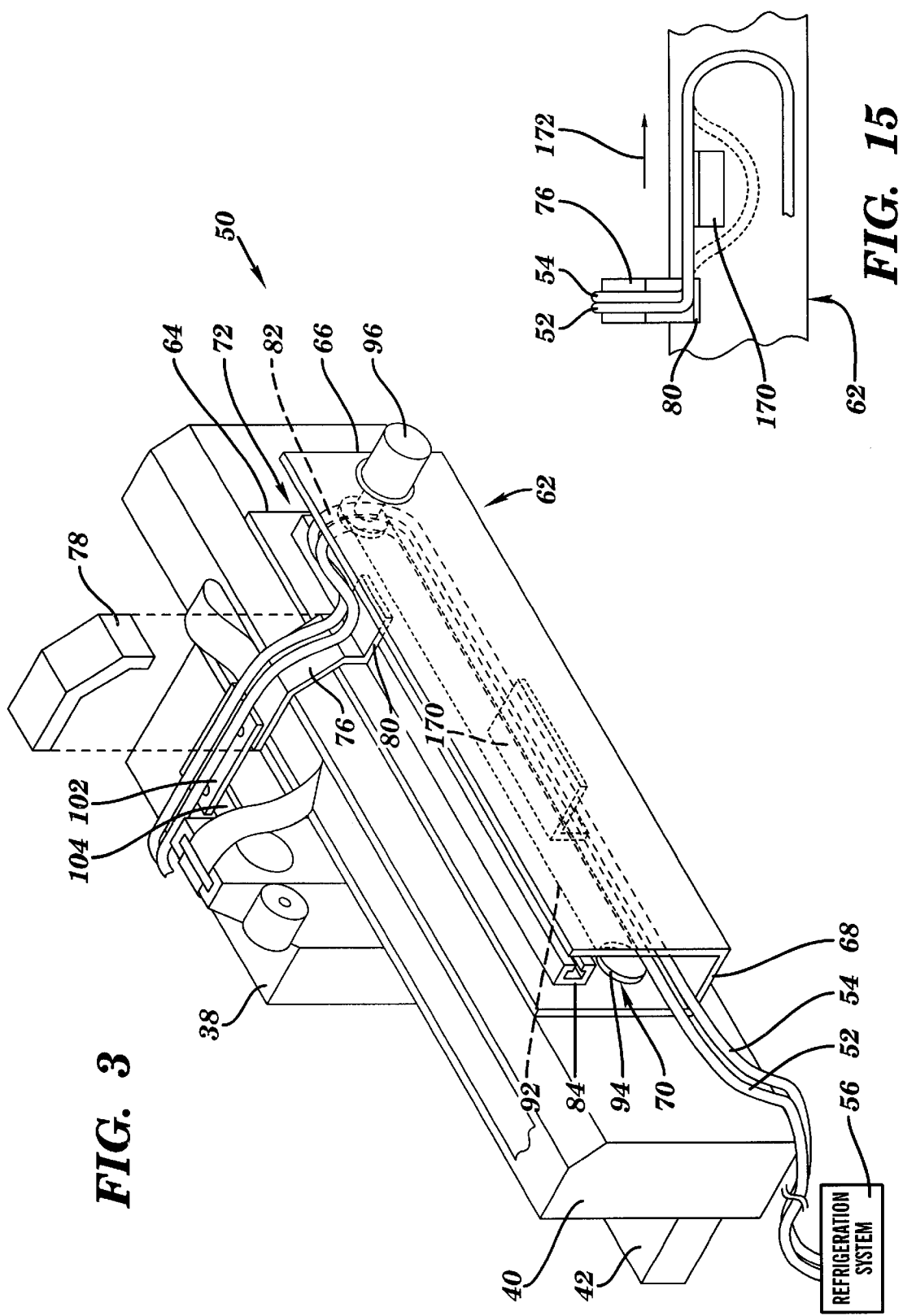

APPARATUS FOR ROUTING HOSES AND CABLES IN AN IMAGING SYSTEM

FIELD OF THE INVENTION

The present invention is in the field of imaging systems. More particularly, the present invention provides an apparatus for routing and flexing coolant hoses and an electrical cable to a laser system mounted on a movable optical carriage in an imaging system without introducing mechanical disturbances to the optical carriage.

BACKGROUND OF THE INVENTION

In many imaging systems, such as imagesetters or platesetters, an optical carriage is used to displace a laser system or other imaging source in a slow scan direction along an internal drum to expose a supply of media supported on the drum. Such an imaging system is described, for example, in U.S. Pat. No. 5,598,739, assigned to the Agfa Division, Bayer Corporation, incorporated herein by reference.

The specific type of laser system employed by an imaging system depends in part on the exposure requirements of the media. For example, when using aluminum plates having a light sensitive surface emulsion, a lower power laser system, such as a doubled frequency Nd (neodymium):YAG (yttruim, aluminum, garnet) laser, may be used. However, when using thermal plates, a higher power laser system is generally required. Unfortunately, such higher power laser systems commonly require a complex cooling system wherein a liquid or gaseous coolant is cycled through the laser system to prevent the laser system from overheating. Additionally, an additional source of power is often required due to tho increased power consumption of many high power laser systems.

To ensure quality and accuracy during imaging, mechanical disturbances to the optical carriage must be minimized to avoid the generation of artifacts in the exposed images. When a cooling system is necessary, the coolant hoses for supplying coolant to the laser system can adversely affect image quality by imparting mechanical disturbances to the optical carriage as the optical carriage is displaced along the internal drum of the imaging system. Further, the coolant hoses may kink during displacement of the optical carriage, causing a blockage of the coolant to the laser system. This may result in the overheating and damage of the laser system. The electrical cable supplying power to the laser system may also disturb the optical carriage during imaging.

SUMMARY OF THE INVENTION

The present invention provides a hose and cable routing system for routing and flexing coolant supply and return hoses between a refrigeration system and the optical carriage of an imaging system, and for routing and flexing an electrical cable between a power source and the optical carriage, without introducing mechanical disturbances to the optical carriage. In a first, preferred embodiment of the present invention, the hose and cable routing system includes a support tray, mounted to the imaging system, for supporting the coolant hoses and electrical cable, and a movable support bracket for supporting and running the coolant hoses and electrical cable from the support tray to the optical carriage. A track is provided to guide the movable support bracket along the imaging system in response to a displacement of the optical carriage or a drive system. A vibration isolator, formed of a material capable of dampening vibrations and other mechanical disturbances, is preferably mounted between the support bracket and the optical carriage.

A second embodiment of the present invention provides a self coiling, retracting, hose and cable support system for supporting the coolant hoses and electrical cable adjacent tho optical carriage. The hose and cable support system includes a concave, flexible tray and a system for extending or retracting the tray in response or in conjunction with a displacement of the optical carriage.

A further embodiment of the present invention provides a hose and cable support system including a coiled, nestable hose assembly for supplying coolant and power to the optical carriage. An upper portion of each coil of the hose assembly is movably supported to a rail by a linear bearing, thereby allowing the hose assembly to expand and contract without kinking in response to a displacement of the optical carriage.

BRIEF DESCRIPTION OF THE DRAWINGS

The features of the present invention will best be understood from a detailed description of the invention and a preferred embodiment thereof selected for the purposes of illustration and shown in the accompanying drawings in which;

FIG. 3 is a respective view of a hose and cable routing system in accordance with a first preferred embodiment of the present invention;

FIG. 15 illustrates the operation of a support bracket for preventing hose buckling in the hose and cable routing system of FIG. 3.

DETAILED DESCRIPTION OF THE INVENTION

Figure 1:
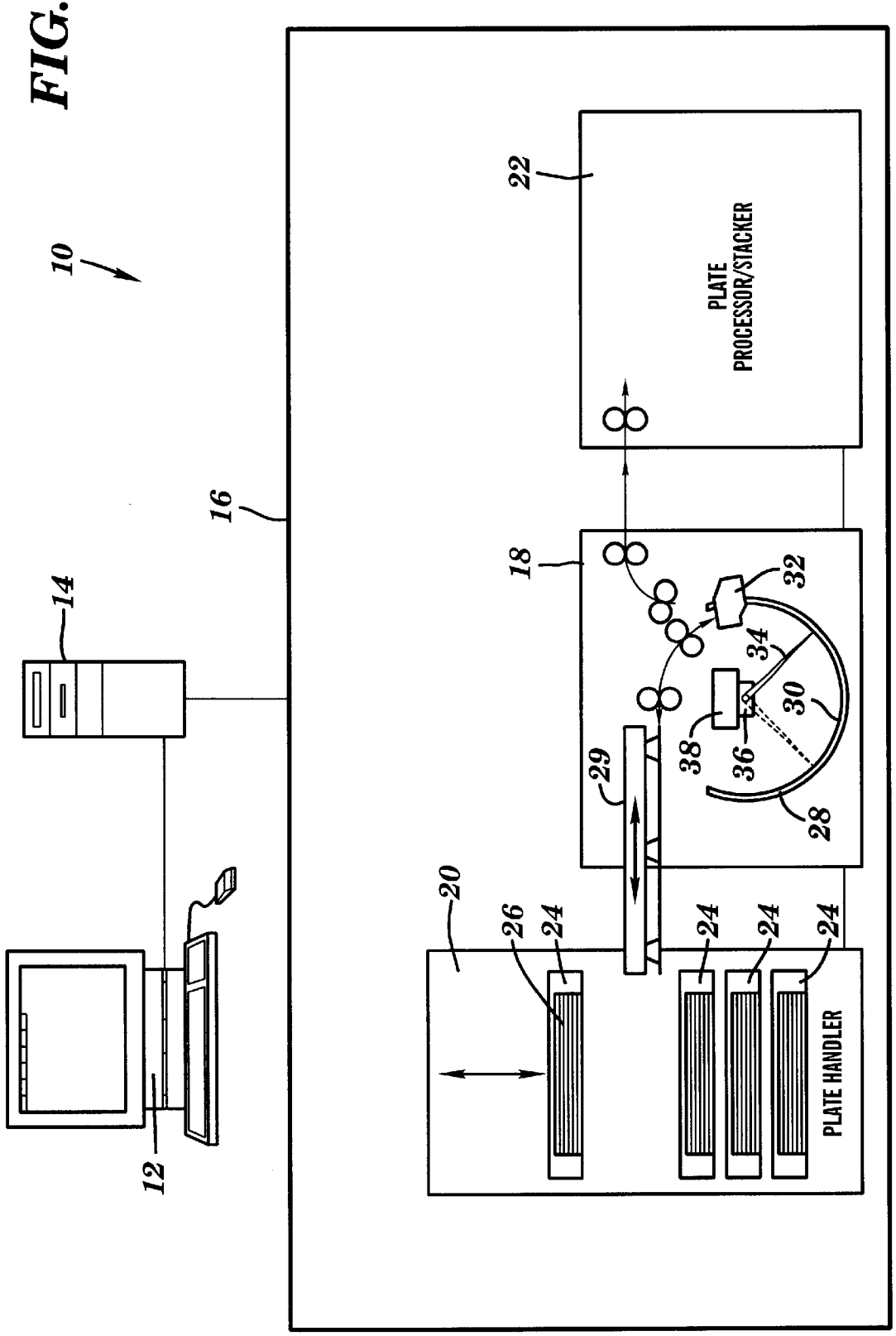
FIG. 1 illustrates an example of an imaging system including a laser system supported on a movable optical carriage.

The objects, features, and advantages of the present invention are illustrated in detail in the accompanying drawings, wherein like reference numerals refer to like elements throughout the drawings.

An example of an internal drum imaging system, generally designated as 10, is illustrated in FIG. 1. In this example, the imaging system 10 is a computer to plate imaging system, commonly referred to as a platesetter, wherein digital data is imaged directly onto a printing plate, Of course, the hose and cable routing system of the present invention may also be used in other types of internal drum imaging systems, including imagesetters, digital proofers, and the like, without departing from the intended scope of the present invention, The imaging system 10 generally includes a front end server or computer 12 for outputting a print job, a raster image processor (RIP) 14 for translating the data corresponding to the print job into a pattern of dots, and a platesetter 16 for imaging the dots onto a printing plate. The platesetter 16 has three major components, including an internal drum imaging engine 18, an on-line plate handler 20, and an on-line plate processor/stacker 22.

The plate handler 20 includes at least one cassette 24 containing a supply of printing plates 26 which are generally formed from aluminum, polyester, or other suitable materials. A plate shuttle mechanism or "picker" 29 removes a single plate 26 from one of the cassettes 24 and transports the plate 26 to the imaging engine 18.

The imaging engine 18 includes an internal drum 28 having a cylindrical imaging surface 30 for supporting a plate 26 during imaging. An applicator assembly 32 is used to position and iron the plate 26 against the imaging surface 30 of the internal drum 28. Once properly positioned by the applicator assembly 32 against the imaging surface 30, the plate 26 is exposed by an imaging beam 34 radiating from a laser system 36 carried by a movable optical carriage 38.

Figure 2:
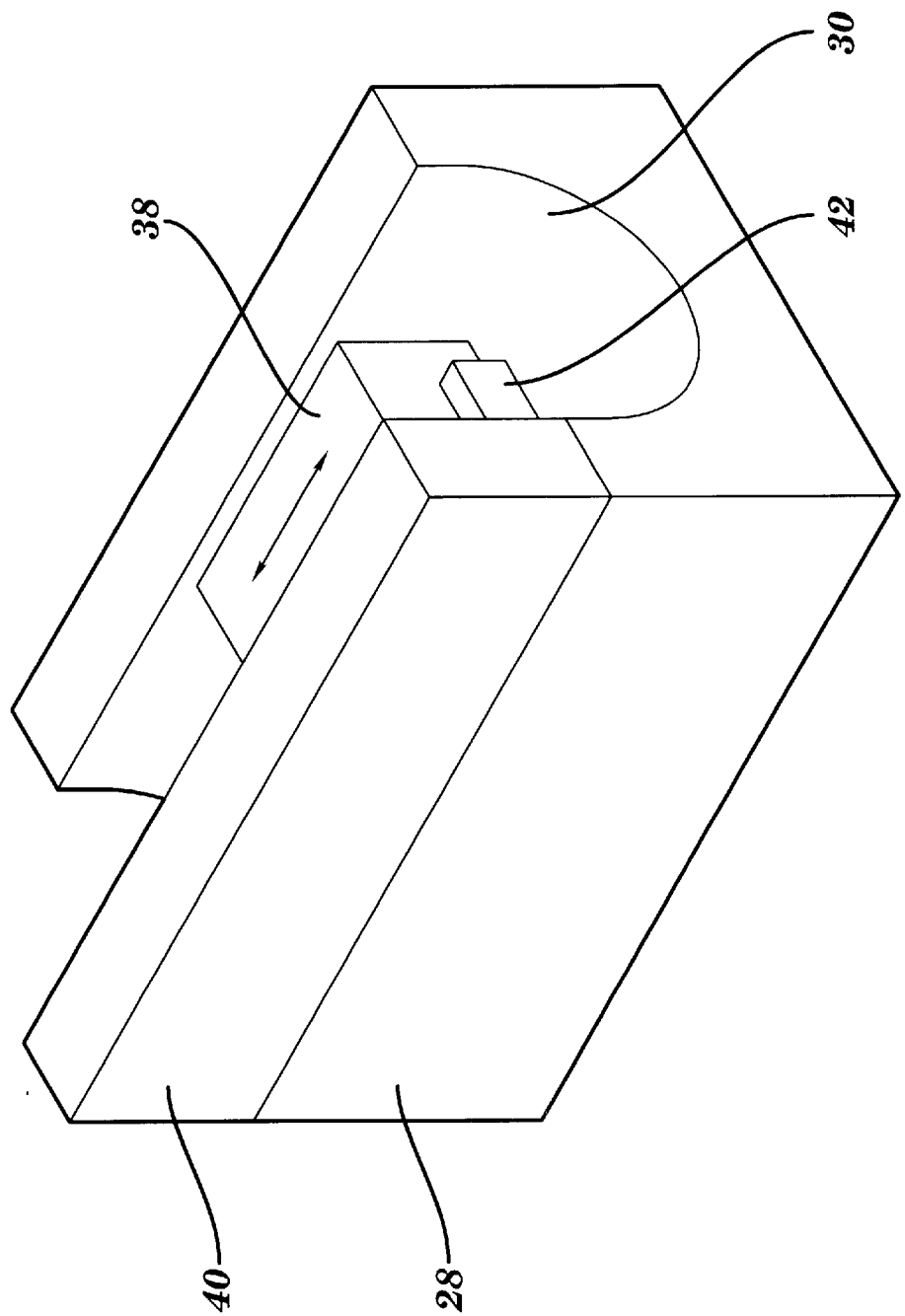
FIG. 2 is a perspective view of a movable optical carriage supported on the upper structure of an internal drum.

Referring to FIG. 2, there is illustrated a perspective view of the optical carriage 38 supported on an upper structure 40 of the internal drum 28. The upper structure 40 includes a rail 42 for movably supporting the optical carriage 38 parallel to the longitudinal axis of the internal drum 28. Additional support structure (not shown) may be used to support/guide the optical carriage 38 relative to the internal drum 28 (see, e.g., U.S. Pat. No. 5,598,739). Preferably, the optical carriage 38 is self-propelled and includes an on-board motor (not shown) for displacing the optical carriage 38 along the internal drum 28. Alternately, external drive means may be used to displace the optical carriage 38.

Figure 4:
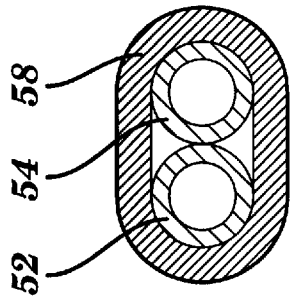
FIG. 4 is a cross-sectional view of an example of a coolant supply hose and a coolant return hose enclosed together within a flexible conduit.
Figure 5:
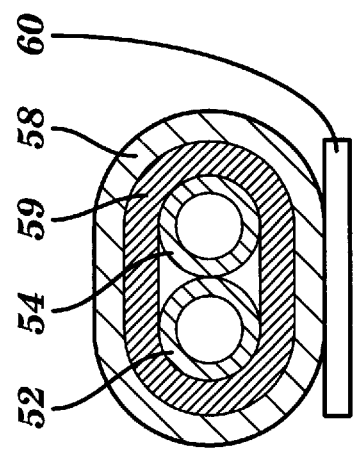
FIG. 5 illustrates in cross-section an electrical cable piggybacked on the flexible conduit of FIG. 4.

A hose and cable routing system 50 in accordance with a first preferred embodiment of the present invention is illustrated in FIG. 3. The hose and cable routing system 50 is provided to route and flex a coolant supply hose 52 and a coolant return hose 54 between a refrigeration system 56, external to tho internal drum imaging engine 18 (FIG. 1), and the laser system 36 mounted on the movable optical carriage 38, without introducing deleterious mechanical disturbances to the optical carriage 38. The coolant supply hose 52 is used to supply a liquid or gaseous coolant from the refrigeration system 56 to the laser system 36. Analogously, the return coolant hose 54 is used to direct and recirculate the coolant warmed by the laser system 36 through the refrigeration system 56 for cooling. The coolant supply and return hoses 52, 54, may be separately coupled between the refrigeration system 56 and the laser system 36, may be attached together along their length, or may be enclosed together within a flexible conduit 58 as illustrated in FIG. 4. As further shown in FIG. 5, an electrical cable 60 for supplying power to the laser system 36, may be piggy-backed on the flexible conduit 58. A layer of insulation 59 is preferably provided over the coolant supply and return hoses 52, 54 along their length to prevent condensation on the exterior of the hoses 52, 54, The layer of insulation 59 is then covered by the flexible conduit 58 to protect the insulation 59 from damage. Alternately, the electrical cable 60 may be attached to one or both of the coolant supply and return hoses 52, 54.

As shown in FIG. 3, the hose and cable routing system 50 includes a support tray 62 mounted to the frame (not shown) of the internal drum 28. The support tray 62 may be mounted to the frame using any suitable hardware. The support tray 62 comprises a first side 64 mounted to the frame, a second side 66 positioned away from and mounted to the first side 64 by a bottom section 68, and first and second open ends 70, 72. The coolant supply and return hoses 52, 54 extend out from the first open end 70 of the support tray 62 to the refrigeration system 56.

The hose and cable routing system 50 further includes a movable support bracket 76 for supporting and running the coolant supply and return hoses 52, 54 over the upper structure 40 to the optical carriage 38 in a direction perpendicular to the direction of motion of the optical carriage 38. A cover assembly 78 is used to secure the coolant supply and return hoses 52, 54 to the support bracket 76. The support bracket 76 includes an outwardly flanged bottom section 80. The distance between the outwardly flanged bottom section 80 of the support bracket 76 and the bottom section 68 of the support tray 62 defines the radius of curvature of bend area 82 of the coolant supply and return hoses 52, 54. The support bracket 76 is preferably formed of metal or other rigid material. However, the support bracket 76 may be formed of plastic, hard rubber or other suitable material having sufficient strength to support the coolant supply and return hoses 52, 54.

A track 84 is provided to guide the support bracket 76 along the upper structure 40 of the internal drum 28 as the optical carriage 38 is displaced along the internal drum 28. The track 84 is attached to the first side 64 of the support tray 62. A wheel assembly 86 (FIG. 6) mounted to the underside of the flanged bottom section 80 of the support bracket 76 includes a wheel 88 that is received within the track 84. The wheel 88 is configured to roll along the track 84 as the optical carriage 38 and the support bracket 76 are displaced along the internal drum 28. As the support bracket 76 changes position, the attached coolant supply and return hoses 52, 54 are lifted off or laid down on the bottom section 68 of the support tray 62 without kinking and without imparting mechanical disturbances to the optical carriage 38. Preferably, the track 84 is aligned parallel to the rail 42 which movably supports the optical carriage 38.

An additional support bracket 170 may be mounted to an interior surface of first side 64 of the support tray 62 to reduce mechanical disturbances caused by the displacement of the coolant supply and return hoses 52, 54. The support bracket 170 prevents the coolant supply and return hoses 52, 54 (and electrical cable 60, if present) from buckling in response to a displacement of the support bracket 76 toward the bend area 82 of the hoses. As further illustrated in FIG. 15, the coolant supply and return hoses 52, 54 are prevented from buckling (as shown in phantom) within the support tray 62 by the support bracket 170 as the support bracket 76 is displaced in the direction indicated by directional arrow 172.

If the optical carriage 38 cannot drive the support bracket 76 without affecting the imaging performance of the laser system 36, an active drive system may be utilized. For example, as illustrated in FIG. 3, a motor/cable drive system may be used to displace the support bracket 76 and attached coolant supply and return hoses 52, 54 along the length of the internal drum 28. Such a motor/cable drive system may include a cable 92, a pulley 94, and a motor 96 for driving the cable 92 around the pulley 94. The cable 92 is attached to the wheel assembly 86 (FIG. 6) or the support bracket 76 such that a displacement of the cable 92 results in a corresponding displacement of the support bracket 76 and attached coolant supply and return hoses 52, 54. A position feedback controller may be used to ensure that the displacement of the support bracket 76 does not lead or lag the optical carriage 38 by more than a predetermined amount.

Figure 6:
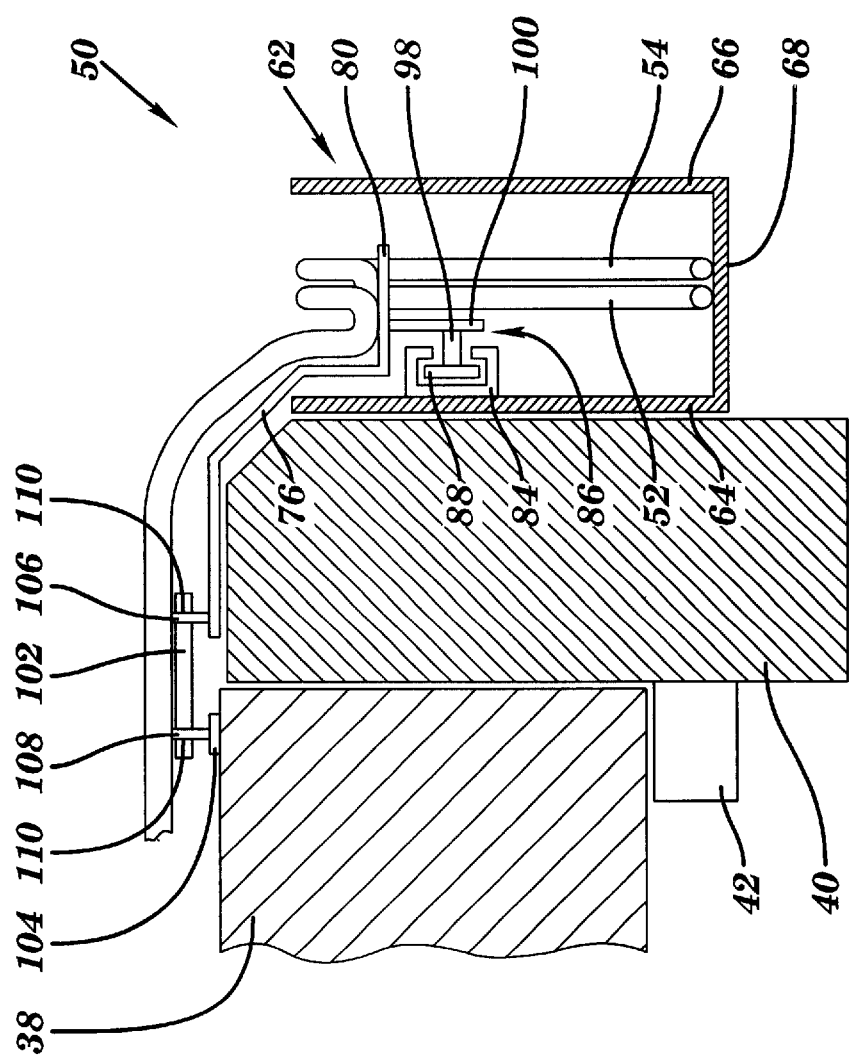
FIG. 6 is a partial cross-sectional view of the hose and cable routing system of FIG. 3.

A partial cross-sectional view of the hose and cable routing system 50 of FIG. 3 is illustrated in FIG. 6. The cover assembly 78 is not shown for clarity. As previously described, the wheel assembly 86 is mounted to the underside of the flanged bottom section 80 of the support bracket 76 and includes the wheel 88 that is received within the track 84. The wheel assembly 86 additionally includes an axle 98 for rotatably supporting the wheel 88, and an axle support 100 mounted to the flanged bottom section 80 of the support bracket 76.

The support bracket 76 may be directly fixed to the optical carriage 38, or may be coupled to the optical carriage 38 using a vibration isolator 102. The vibration isolator 102 is preferably formed of rubber. However, other materials capable of dampening vibrations or other mechanical disturbances generated by the hose and cable routing system 50, the coolant supply and return hoses 52, 54, or other sources, may be used without departing from the intended scope of the present invention.

Figure 7:
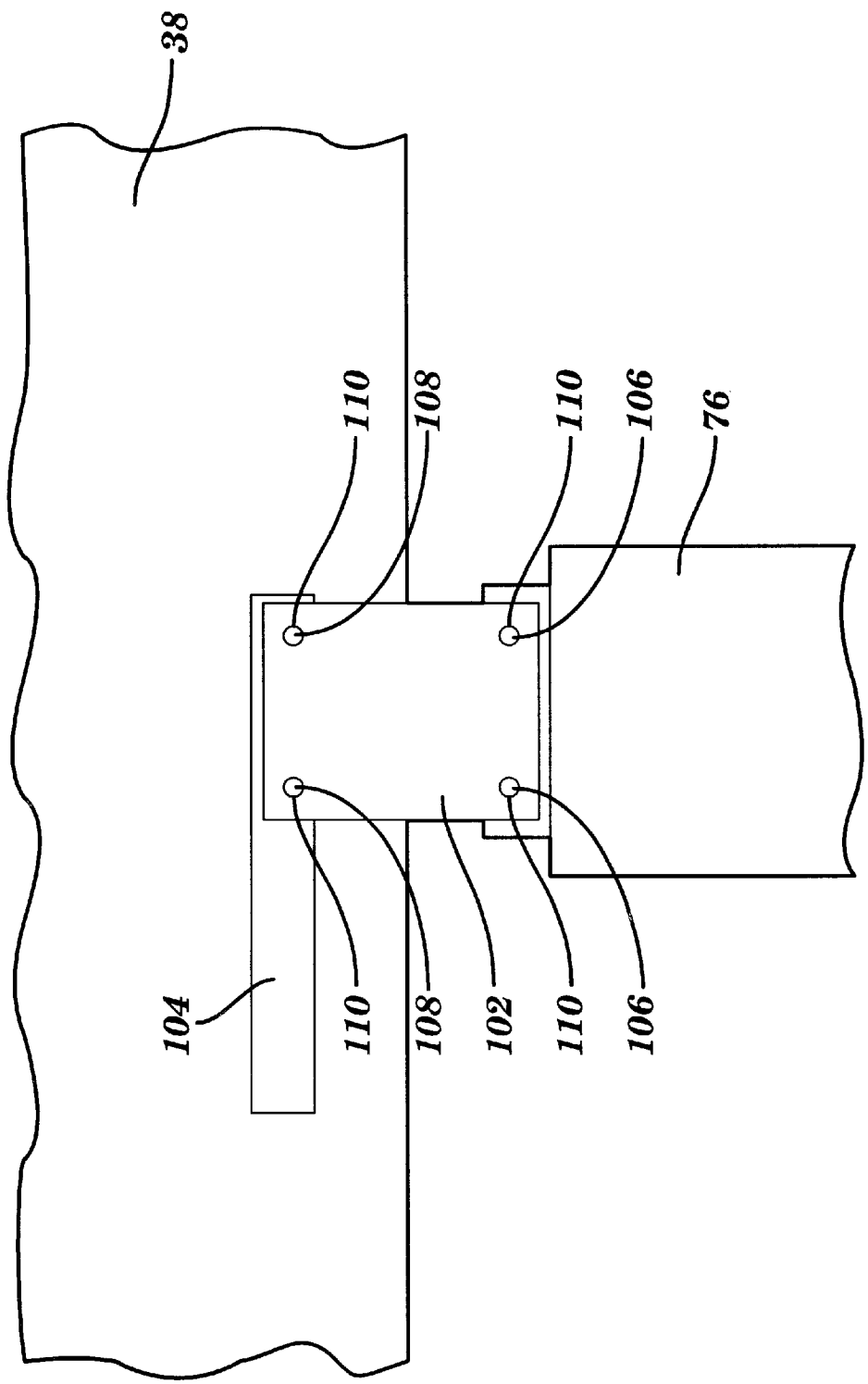
FIG. 7 is a partial plan view of a hose support bracket in accordance with the present invention.

The vibration isolator 102 is mounted between the support bracket 76 and a mounting assembly 104 fixed to the optical carriage 38. As illustrated in FIGS. 6 and 7, one end of the support bracket 76 includes a plurality of mounting posts 106. Similarly, the mounting assembly 104 includes a plurality of mounting posts 108. The mounting posts 106, 108 are inserted into corresponding mounting holes 110 formed on the vibration isolator 102. Securing hardware (not shown) may be positioned on each of the mounting posts 106, 108 to prevent the vibration isolator from dislodging. Other known hardware may alternately be used to join the vibration isolator 102 between the support bracket 76 and the mounting assembly 104.

Figure 8:
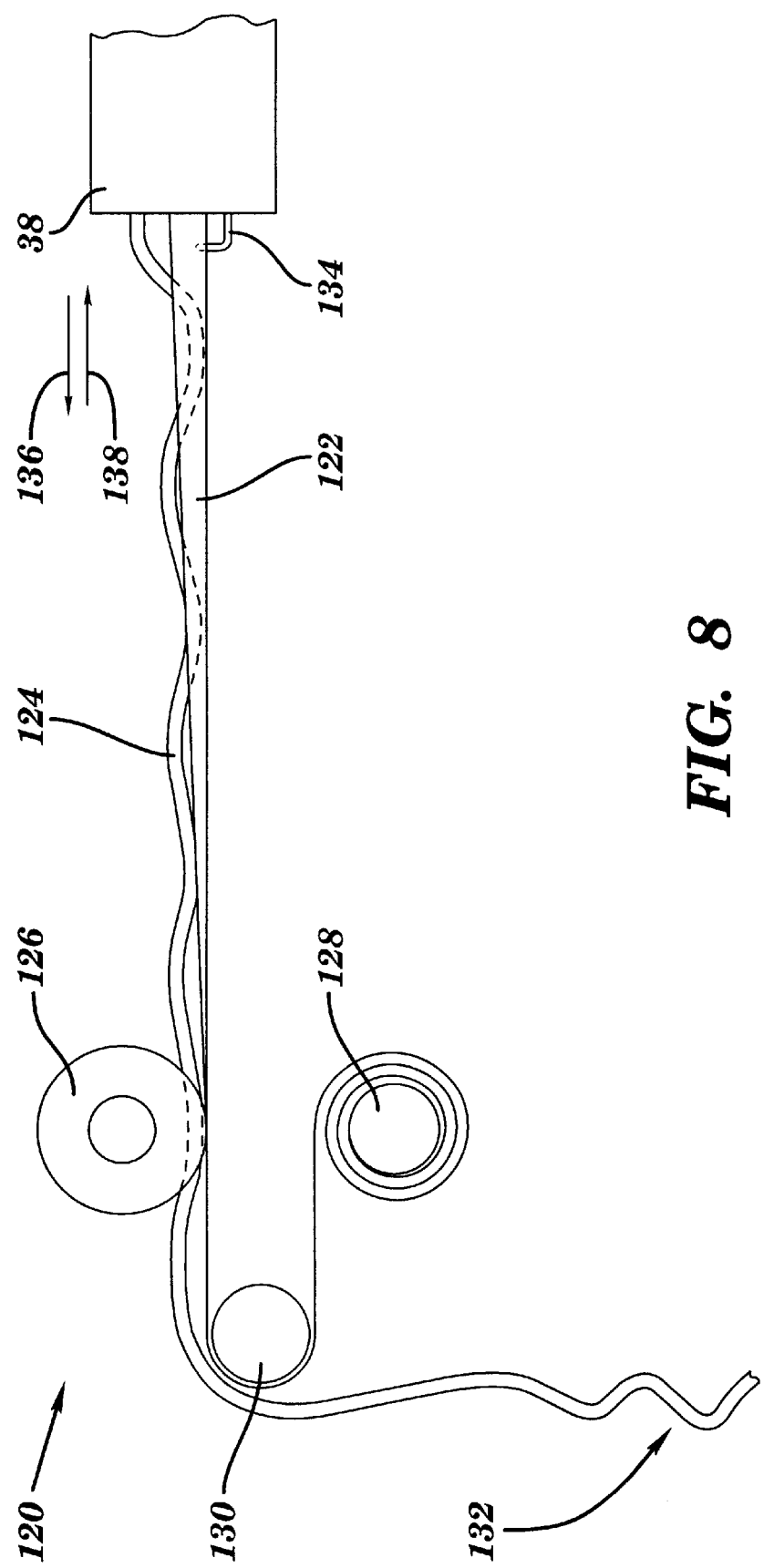
FIGS. 8 and 9 illustrate a self coiling, retracting, hose and cable support system in accordance with an alternate embodiment of the present invention.
Figure 9:
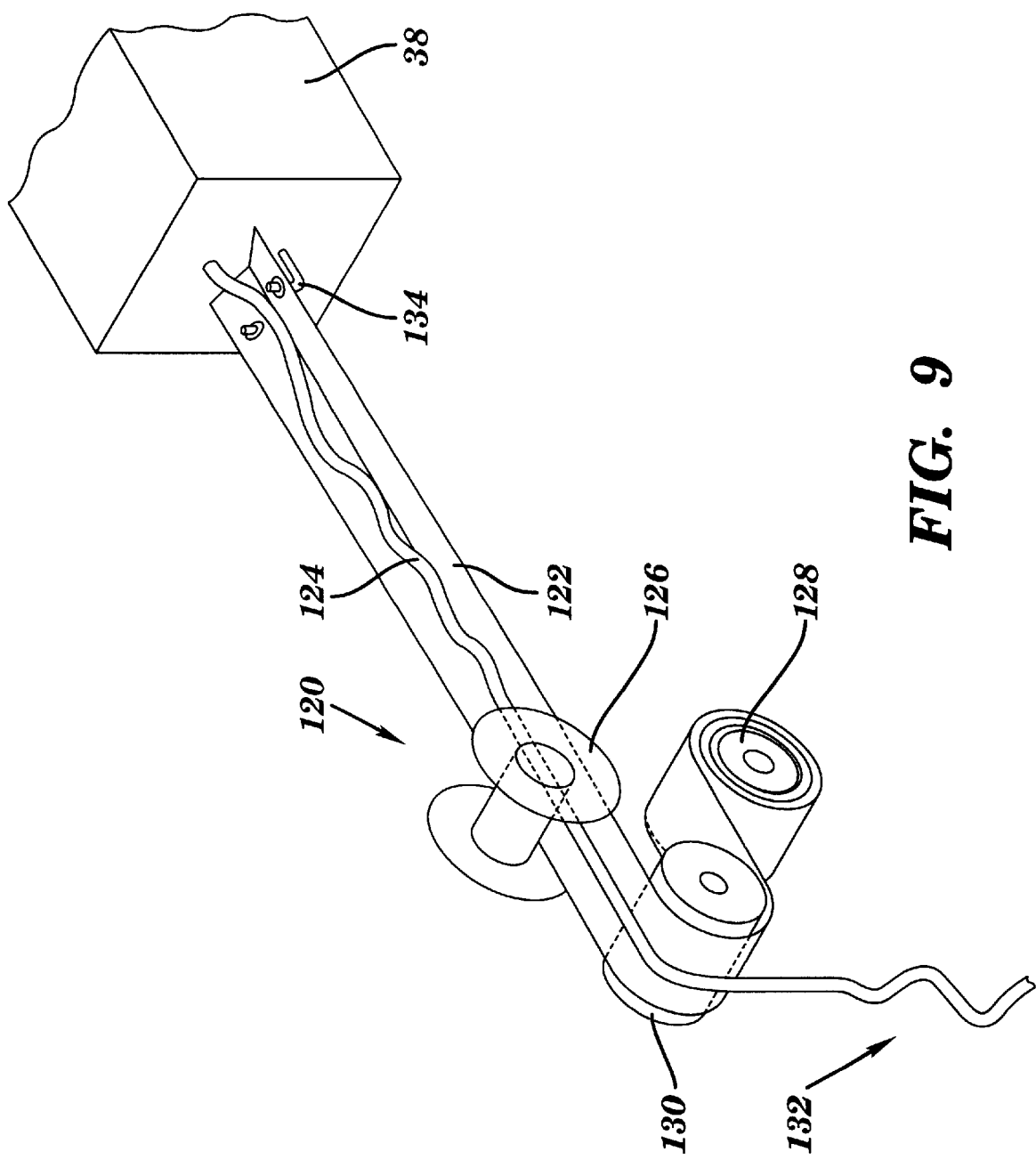

A self coiling, retracting, hose and cable support system 120 in accordance with an alternate embodiment of the present invention is illustrated in FIGS. 8 and 9. The hose and cable support system 120 includes a concave flexible tray 122 for supporting coolant supply and return hoses and/or power cables, illustrated for clarity as a single hose 124 in FIGS. 8 and 9, as the optical carriage 38 is displaced along the internal drum 28 of the imaging system. The tray 122 extends substantially horizontally away from the optical carriage 38. The hose and cable support system 120 further includes a spool roller 126 for keeping the hose 124 on the tray 122, a driven roller 128 for winding or unrolling the tray 122, and an idle roller 130 for tensioning the tray 122 as the tray 122 is retracted or extended, and for guiding the hose 124 to a coiling location 132. A first end of the hose 124 is attached to the side or other suitable location on the optical carriage 38 using mounting hardware 134. The other end of the hose 124 is attached to a refrigeration/power system (not shown).

The tray 122 supports the hose along a portion of its length. As the optical carriage 38 is displaced along the internal drum in the direction indicated by directional arrow 136, the tray 122 is retracted and coiled onto the driven roller 128. As shown, retraction of the hose 124 is effected by a clockwise rotation of the driven roller 128. As the tray 122 is retracted, portions of the hose 124 previously supported by the tray 122 pass over the idle roller 130 and descend toward the coiling location 132. In the coiling location, the hose 124 curls on itself without kinking. Sufficient slack is maintained in the hose 124 to prevent the hose 124 from disturbing the optical carriage 38 during imaging. Further, the rotation of the driven roller 128 may be controlled via a positional controller or the like according to the displacement of the optical carriage 38 to minimize mechanical disturbances imparted to the optical carriage 38 by the hose 124, tray 122, or other sources.

The tray 122 is extended to support the hose 124 as the optical carriage 38 is displaced along the internal drum in a reverse direction as indicated by directional arrow 138. Extension of the tray 122 occurs in response to a counter-clockwise rotation of the driven roller 128. As the tray 122 is extended and passes over the idle roller 130, the hose 124 is pulled onto and supported by the tray 122 without introducing mechanical disturbances to the optical carriage 38.

Figure 10:
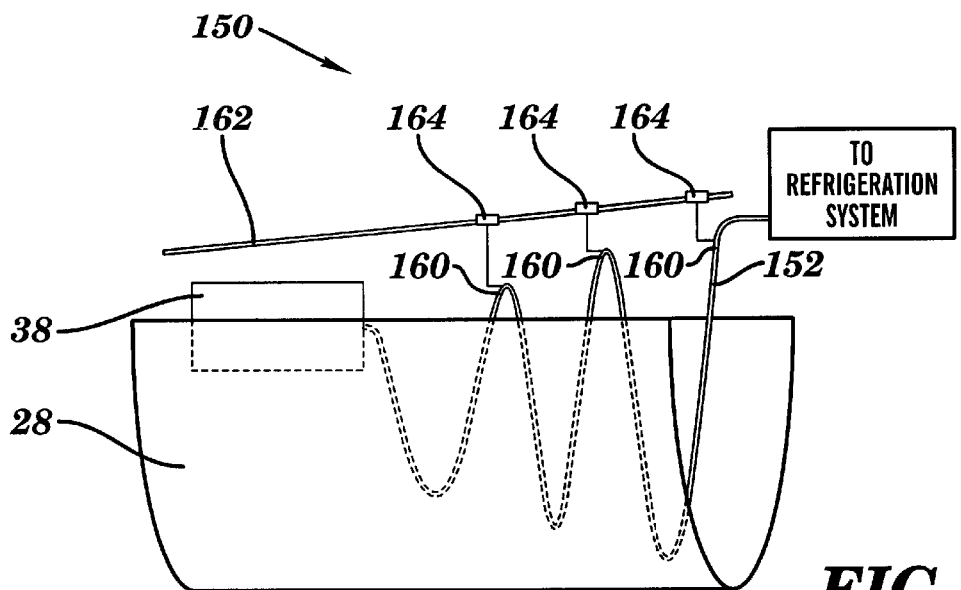
FIGS. 10 and 11 illustrate another embodiment of a hose and cable support system in accordance with the present invention in extended and compressed states, respectively.
Figure 11:
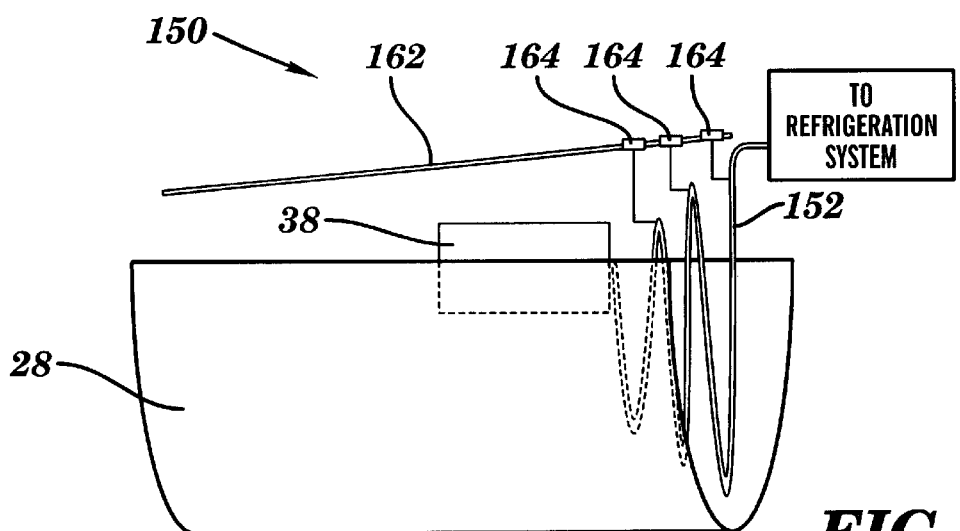

Yet another embodiment of a hose and cable support system 150 in accordance with the present invention is illustrated in FIGS. 10 and 11. In this embodiment of the present invention, a coiled, nestable hose assembly 152, incorporating coolant supply and return hoses 154, 156 and a power cable 158 (see FIG. 12) is used to deliver coolant and power to a laser system on the movable optical carriage 38 with minimal disturbances to the optical carriage 38 during imaging.

Figure 12:
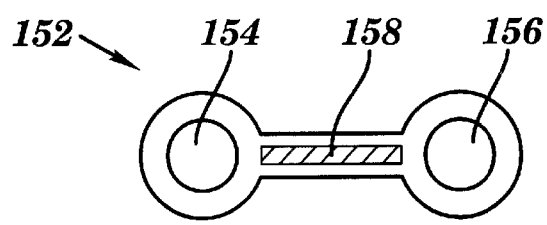
FIG. 12 is a cross-sectional view of the hose assembly used in the hose and cable support system of FIGS. 10 and 11.
Figure 13:
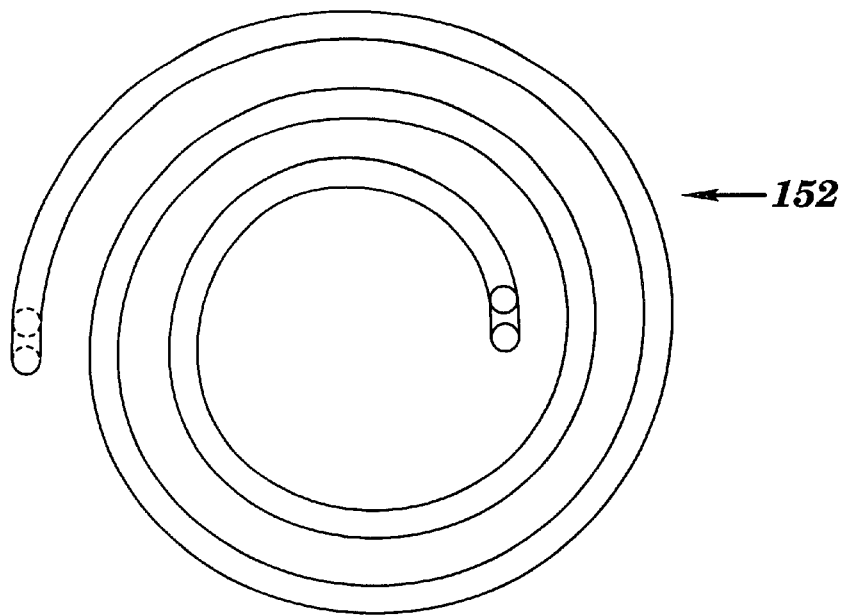
FIG. 13 illustrates the nested configuration of the hose assembly.
Figure 14:
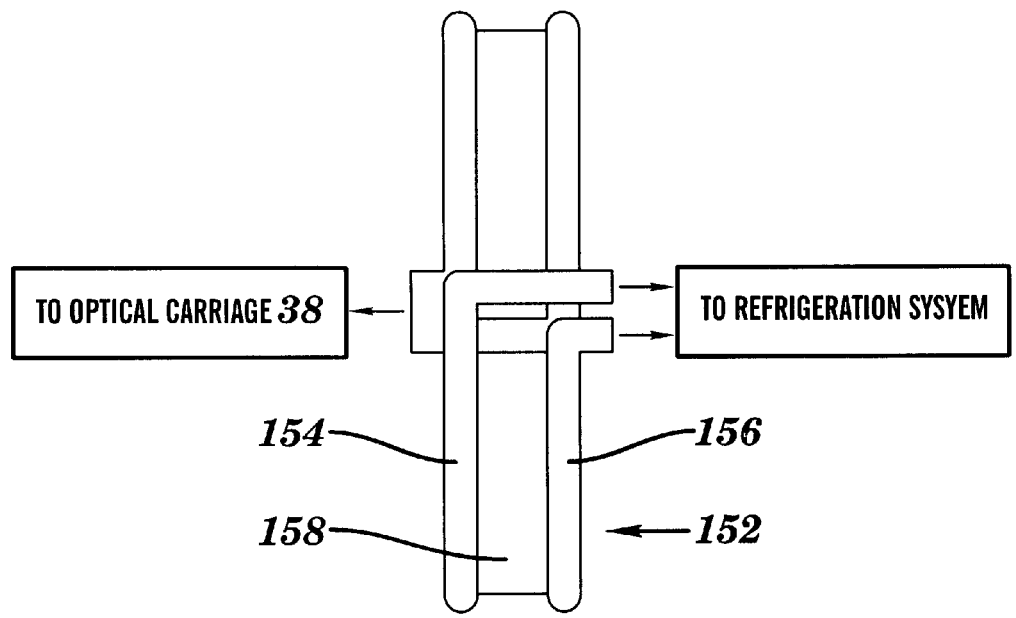
FIG. 14 illustrates the hose assembly in a fully nested state.

As shown in FIG. 12, the hose assembly 152 includes a single hose that is preferably formed in a "dog-bone" shape, wherein the coolant supply hose 154 and coolant return hose 156 are joined and separated by the power cable 158. As further shown in FIG. 13, the hose assembly 152 is preferably formed in a coiled nested configuration such that when the hose assembly 152 is in a maximally compressed state, the overall width of the nested coil is approximately that of the single hose (FIG. 14).

Returning to FIGS. 10 and 11, the hose assembly 152 is connected between the optical carriage 38 and a refrigeration system. 4 smaller diameter end of the hose assembly 152 is attached to the optical carriage 38. A larger diameter end of the hose assembly 152 is attached to the refrigeration system. The hose assembly 152, due to its nested, coiled configuration, is capable of extending (FIG. 10) or compressing (FIG. 11) in response to a displacement of the optical carriage 38.

An upper portion of each coil 160 of the hose assembly 152 is movably supported to a rail 162 by a linear bearing 164 or other similar device. The linear bearings 164 allow the hose assembly 162 to expand and contract in response to a displacement of the optical carriage 38 without introducing mechanical disturbances to the optical carriage 38. As shown, the rail 162 may be tilted at an angle with respect to the optical carriage 38 to use gravity to negate the extra load of the hose assembly 152 on the imaging carriage 38, and to overcome the drag forces of the hose assembly 152 on the rail 164.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

We claim:

1. An imaging system comprising:
   an optical carriage;
   a laser system carried by the optical carriage;
   a system for displacing the optical carriage during imaging; and
   a hose routing system for routing a hose assembly to the optical carriage, without introducing mechanical disturbances to the optical carriage as the optical carriage is displaced during imaging, the hose routing system including a support tray for supporting the hose assembly, a movable support bracket, attached to the optical carriage and the hose assembly, and displaced in response to a displacement of the optical carriage, for directing the hose assembly from the support tray to the optical carriage, and a vibration isolator for attaching the movable support bracket to the optical carriage.

2. The imaging system according to claim 1, wherein the hose assembly includes a coolant supply hose for supplying coolant from a refrigeration system to the laser system carried by the optical carriage, and a coolant return hose for returning the coolant from the laser system to the refrigeration system.

3. The imaging system according to claim 1, wherein the hose assembly includes an electrical cable for supplying power to the laser system.

4. The imaging system according to claim 1,
   wherein the hose routing system is configured such that the hose assembly is lifted off or laid down on the support tray in response to a displacement of the movable support bracket.

5. The imaging system according to claim 1, wherein the vibration isolator dampens mechanical disturbances produced by the hose assembly or the hose routing assembly.

6. The imaging system according to claim 1, wherein the vibration isolator is formed of rubber.

7. The imaging system according to claim 1, wherein the hose routing system further includes:
   a wheel assembly attached to the movable support bracket; and
   a track for guiding the wheel assembly in response to a displacement of the movable support bracket.

8. The imaging system according to claim 7, wherein the track is aligned substantially parallel to a displacement direction of the optical carriage.

9. The imaging system according to claim 1, further including:
   a drive system for displacing the movable support bracket during a displacement of the optical carriage.

10. The imaging system according to claim 1, further including:
    a system for preventing buckling of the hose assembly within the support tray.

11. An imaging system comprising:
    an optical carriage;
    a laser system carried by the optical carriage;
    a system for displacing the optical carriage during imaging; and
    a hose routing system for routing a hose assembly to the optical carriage, wherein the hose routing system further includes:
    a flexible tray for supporting a portion of the hose assembly adjacent the optical carriage; and
    a winding system for winding or unrolling the flexible tray in response to a displacement of the optical carriage.

12. The imaging system according to claim 11, wherein the flexible tray extends substantially horizontally away from the optical carriage.

13. The imaging system according to claim 11, wherein the flexible tray is concave.

14. The imaging system according to claim 11, wherein the winding system further includes:
    a driven roller for winding or unrolling the flexible tray.

15. The imaging system according to claim 11, further including:
    a spool roller for keeping the hose assembly on the flexible tray.

16. The imaging system according to claim 11, further including a mounting system for attaching an end of the flexible tray to the optical carriage.

17. The imaging system according to claim 11, wherein a length of the hose assembly supported by the flexible tray increases or decreases in response to an unrolling or winding of the flexible tray, respectively.

18. An imaging system comprising:
    an optical carriage;
    a laser system carried by the optical carriage;
    a system for displacing the optical carriage during imaging; and
    a hose routing system for routing a hose assembly to the optical carriage, wherein the hose assembly comprises a plurality of coils nestable within each other.

19. The imaging system according to claim 18, wherein the hose routing system further includes:
    a rail; and
    a plurality of bearing elements for movably supporting the plurality of nestable coils on the rail;
    wherein the hose assembly expands or contracts in response to a displacement of the optical carriage.

20. The imaging system according to claim 19, wherein the rail is tilted at an angle with respect to the optical carriage.

21. The imaging system according to claim 18, wherein the hose assembly further includes:
    a coolant supply hose for supplying coolant from a refrigeration system to the laser system carried by the optical carriage, a coolant return hose for returning the coolant from the laser system to the refrigeration system, and an electrical cable for supplying power to the laser system.

22. The imaging system according to claim 21, wherein the coolant supply hose and the coolant return hose are joined and separated by the electrical cable.

23. The imaging system according to claim 18, wherein plurality of nestable coils are configured such that when the plurality of nestable coils are in a maximally compressed state, an overall width of the plurality of nestable coils is approximately that of a single one of the coils.

24. An imaging system comprising:
    an optical carriage;
    a laser system carried by the optical carriage;
    a system for displacing the optical carriage during imaging; and
    a hose routing system for routing a hose assembly to the optical carriage, the hose routing system including a support tray for supporting the hose assembly, a movable support bracket, attached to the optical carriage and the hose assembly, for directing the hose assembly from the support tray to the optical carriage, a wheel assembly attached to the movable support bracket, and a track for guiding the wheel assembly in response to a displacement of the movable support bracket.

25. The imaging system according to claim 24, wherein the track is aligned substantially parallel to a displacement direction of the optical carriage.

26. An apparatus, comprising:

a support surface for supporting a supply of recording media;

an optical carriage;

an imaging system carried by the optical carriage;

a system for displacing the optical carriage along the support surface during imaging of the recording media; and a hose routing system for routing a hose assembly to the optical carriage, the hose routing system including a support tray for supporting the hose assembly, a movable support bracket, attached to the optical carriage and the hose assembly, and displaced in response to a displacement of the optical carriage, for directing the hose assembly from the support tray to the optical carriage, and a vibration isolator for attaching the movable support bracket to the optical carriage.

27. The apparatus according to claim 26, wherein the imaging system is a computer to plate imaging system.

28. The apparatus according to claim 26, wherein the imaging system comprises a laser system, and wherein the hose assembly supplies coolant to the laser system.

29. The apparatus according to claim 26, wherein the recording media comprises a printing plate.

30. The apparatus according to claim 29, wherein the printing plate comprises a thermal printing plate.

31. An apparatus comprising:

an optical carriage;

an imaging system carried by the optical carriage;

a system for displacing the optical carriage during imaging; and a hose routing system for routing a hose assembly to the optical carriage, the hose routing system including a support tray for supporting the hose assembly, a movable support bracket, attached to the optical carriage and the hose assembly, and displaced in response to a displacement of the optical carriage, for directing the hose assembly from the support tray to the optical carriage, and a vibration isolator for attaching the movable support bracket to the optical carriage.

\* \* \* \* \*